Feb. 10, 1970　　　KARL-HEINZ WILMS　　　3,494,700
APPARATUS FOR MEASURING THE REFRACTIVE POWER OF A LENS
Filed Sept. 16, 1965

Inventor
Karl-Heinz Wilms
By Richard Low
Agt

# United States Patent Office 3,494,700
Patented Feb. 10, 1970

3,494,700
APPARATUS FOR MEASURING THE REFRACTIVE POWER OF A LENS
Karl-Heinz Wilms, Dachau, near Munich, Germany, assignor to Optische Werke G. Rodenstock, Munich, Germany, a company of Germany
Filed Sept. 16, 1965, Ser. No. 487,666
Int. Cl. G01b 9/00
U.S. Cl. 356—125                                7 Claims

ABSTRACT OF THE DISCLOSURE

The annular lens carrier of a lensometer is threadedly mounted on the normally stationary support of the associated optical system so that it moves along the optical axis of the system when turned. The angular position of the carrier relative to the support is indicated by a fixed mark on the support on a circular scale on the carrier calibrated in diopters of the convex surface of a tested lens. When the fixed mark is aligned with the proper scale mark, the vertex of a correspondingly curved lens is located precisely in the focus of the optical system.

---

Figure 1:
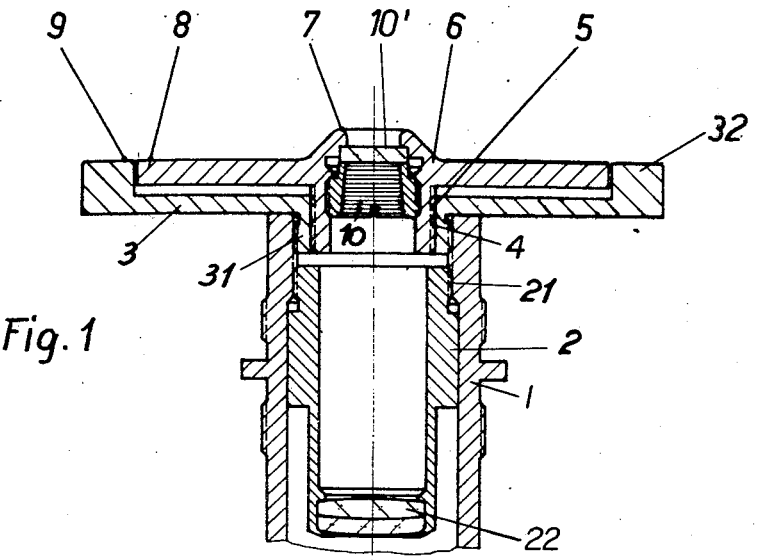

This invention relates to the determination of the vertex refractive power of lenses such as spectacle lenses or contact lenses, and particularly to improvements in apparatus for measuring vertex refractive power, hereinafter referred to as lensometer.

Conventional apparatus of the type described is provided with a carrier which holds the lens to be tested in the focus of an optical system which together with the lens to be tested provides an image of an adjustable index at infinity. The carrier normally has a bearing face which is a circular ring about the axis of the optical system or defines a bearing surface of annular shape which is transversely oriented to the optical axis.

When a lens is deposited on the annular bearing face of the carrier, the axial position of the vertex of the lens surface varies with the radius of curvature of the lens surface in contact with the bearing surface. The resulting margin of error in the determination of refractive lens power is negligible when ordinary spectacle lenses are tested whose radius of curvature is large as compared to the effective diameter of the bearing surface which is chosen as small as possible to minimize the error margin. Yet, the opening in the bearing face must not be too small in order not to restrict the passage of the light beam of the apparatus, particularly in a projection-type instrument.

A satisfactory compromise value for the diameter of the lens bearing surface is not available for lenses having a face of very small radius of curvature, as is usual in contact lenses. The results obtained on conventional lensometers with such lenses are subject to substantial errors because of variations in the placement of the vertex. Special carriers have been adapted for use with such small lenses, but they are specifically designed for lenses of one radius of curvature only. It has therefore been necessary heretofore to provide conventional lensometers with correction tables which permit correct values of refractive power to be calculated from observed values and the known radius of curvature of the lens face in contact with the lens carrier.

The primary object of the invention is the provision of a lens carrier for an apparatus of the type described which permits proper compensation for the curvature of the seated lens face to be made simply, quickly, and without calculations.

Another object is the provision of an attachment for a known lensometer which makes the apparatus suitable for directly measuring vertex refractive power of any lens with high precision regardless of the radius of curvature of the tested lens.

With these and other objects in view, as will hereinafter become apparent, I provide a lensometer with a lens carrier which defines an annular bearing surface about the axis of the optical system and extending transversely of that axis, and with adjustment means for axially moving the lens carrier relative to the optical system. This arrangement permits any lens to be positioned precisely in the focus of the optical system regardless of the radius of curvature of the lens face which contacts the bearing surface of the carrier.

Figure 2:
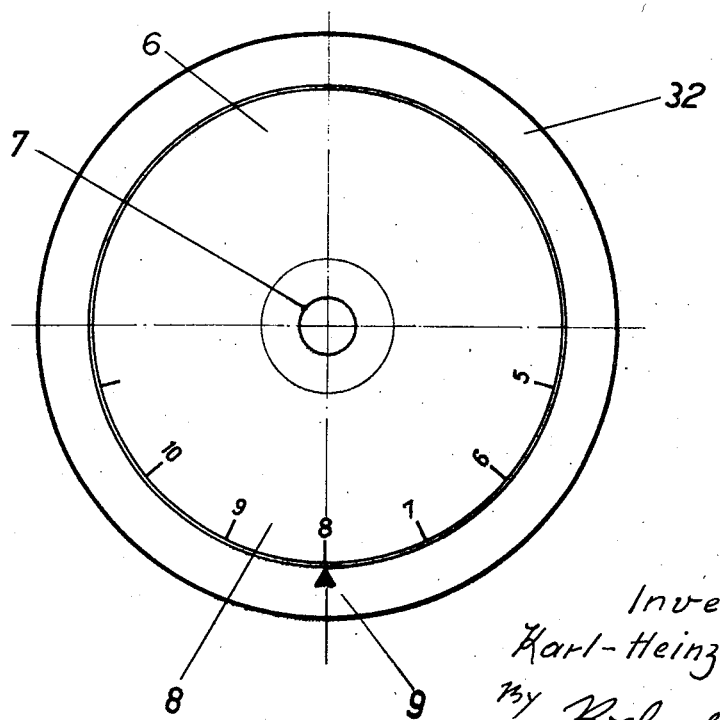

Other features and many of the attendant advantages of this invention will be readily appreciated as the same becomes better understood by reference to the following detailed description of a preferred embodiment when considered in connection with the accompanying drawing, in which:

FIG. 1 shows an apparatus of the type described and equipped with the lens carrier of the invention, the view being in fragmentary elevational section; and FIG. 2 shows the device of FIG. 1 in plan view.

Only as much of an apparatus for determining the vertex refractive power of a lens has been shown as is needed for an understanding of the invention, and the portions of the device omitted from the drawing may be entirely conventional, and are not in themselves relevant to this invention.

Referring initially to FIG. 1, there is seen a tube 1 which is an element of the supporting frame of the apparatus, not otherwise shown. The optical system, which focuses a light beam on the tested lens, is represented by a lens barrel 2 supported in the tube 1 by coaxial threads 21 and carrying a lens 22. The structure described so far may also be found in conventional lensometer. This invention resides more particularly in the lens carrier assembly.

The latter includes a stationary flange 3 integral with a short coaxial nipple 31, which is internally and externally threaded, and having an axially raised outer rim 32. The external threads of the nipple 31 engage corresponding threads in the tube 1, and the flange 3 axially abuts against the end face of the tube 1. The flange 3 and its rim 32 form a flat cup in whose cavity a circular disc 6 is rotatably mounted on an integral tubular hub 5. Threads 4 on the hub engage the internal threads on the nipple 31. The central portion of the disc 6 is axially offset to constitute a generally frustoconical, tubular lens carrier 7.

The axially terminal portion of the lens carrier 7 provides an annular bearing surface for lenses to be supported thereon. The bearing surface tapers convexly from a radial face portion of the lens carrier in a direction inward of the lens carrier and toward the axis of the latter which coincides with the axis of the optical system. The bearing surface thus is approxiately toroidal in shape.

As better seen in FIG. 2, the peripheral rim of the disc 6 is provided with a scale 8, and a mark 9 on the raised rim 32 permits the relative angular position of the disc 6 and of the flange 3 to be read with great precision from the scale 8. The diameter of the latter is almost eight times the maximum diameter of the bearing surface.

A tubular plug 10 threadedly mounted in the hub 5 holds a circular glass plate 10' which seals the central aperture of the lens carrier 7, and prevents contamination of the optical system by dust and the like.

The pitch of the threads 4, the configuration of the bearing surface on the lens carrier 7, and the diameter of the disc 6 are selected in such a manner that the vertices of lenses supported on the carrier 7 and varying over the entire practical range of radii of curvature can be held in the same axial position on the apparatus by turning the disc 6 through less than one full revolution. Under these conditions, the scale 8 may be calibrated directly in diopters, as shown in FIG. 2.

The operation of the apparatus thus is very simple. A lens whose convex face has a known radius of curvature is set on the bearing surface of the lens carrier. When the disc 6 is turned until the diopter number on the scale 8 corresponding to the lens curvature is aligned with the mark 9, the focus of the optical system is radially aligned with the lens carrier, and the vertex of the lens tested is precisely positioned on the lensometer, whereupon the refractive power of the lens can be determined in the usual manner.

The lens carrier assembly may be a permanent part of a lensometer, or it may be used as an attachment with lensometers of otherwise conventional design.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. In an apparatus for measuring the refractive power of a lens, in combination:
   (a) a normally stationary support;
   (b) an optical system mounted on said support, said system having an optical axis and including means for focusing an axial light beam;
   (c) a lens carrier mounted on said support and defining a bearing surface, said surface being annular about said axis and transverse thereto;
   (d) adjustment means for axially moving said lens carrier on said support toward and away from the focus of said beams; and
   (e) indicating means on said support for indicating the relative axial position of said bearing surface and of said support.
2. In an apparatus as set forth in claim 1, said adjustment means including threads on said support and on said lens carrier, said threads being engaged for threaded relative movement of said carrier and of said support about said axis.
3. In an apparatus as set forth in claim 2, said indicating means including two cooperating indicia means on said support and on said lens carrier respectively for indicating the relative axial position of said carrier and of said system, one of said indicia means being a scale substantially circularly arcuate about said axis, and the other indicia means being an index mark.
4. In an apparatus as set forth in claim 3, a disc member coaxially secured to said carrier and having a rim portion of a diameter which is several times greater than the maximum diameter of said annular bearing surface, one of said indicia means being arranged on said rim portion.
5. In an apparatus as set forth in claim 1, said bearing surface being toroidally curved.
6. In an apparatus as set forth in claim 1, said bearing surface being convex in section through said axis.
7. In an apparatus as set forth in claim 6, said bearing surface tapering in an axial direction toward said optical system.

References Cited
UNITED STATES PATENTS

| | | | |
|---|---|---|---|
| 1,305,980 | 6/1919 | Henker | 88—56 |
| 1,550,263 | 8/1925 | Khalil. | |
| 2,191,107 | 2/1940 | Glancy | 88—56 |
| 2,723,594 | 11/1955 | Lueck | 88—56 |
| 3,332,320 | 7/1967 | Lueck | 88—56 |

FOREIGN PATENTS 865,486  4/1961  Great Britain.

RONALD L. WIBERT, Primary Examiner

T. R. MOHR, Assistant Examiner

U.S. Cl. X.R.
356—124